July 23, 1935.  F. L. CRADDOCK  2,008,684
EMULSIFYING UNIT
Filed Oct. 27, 1931
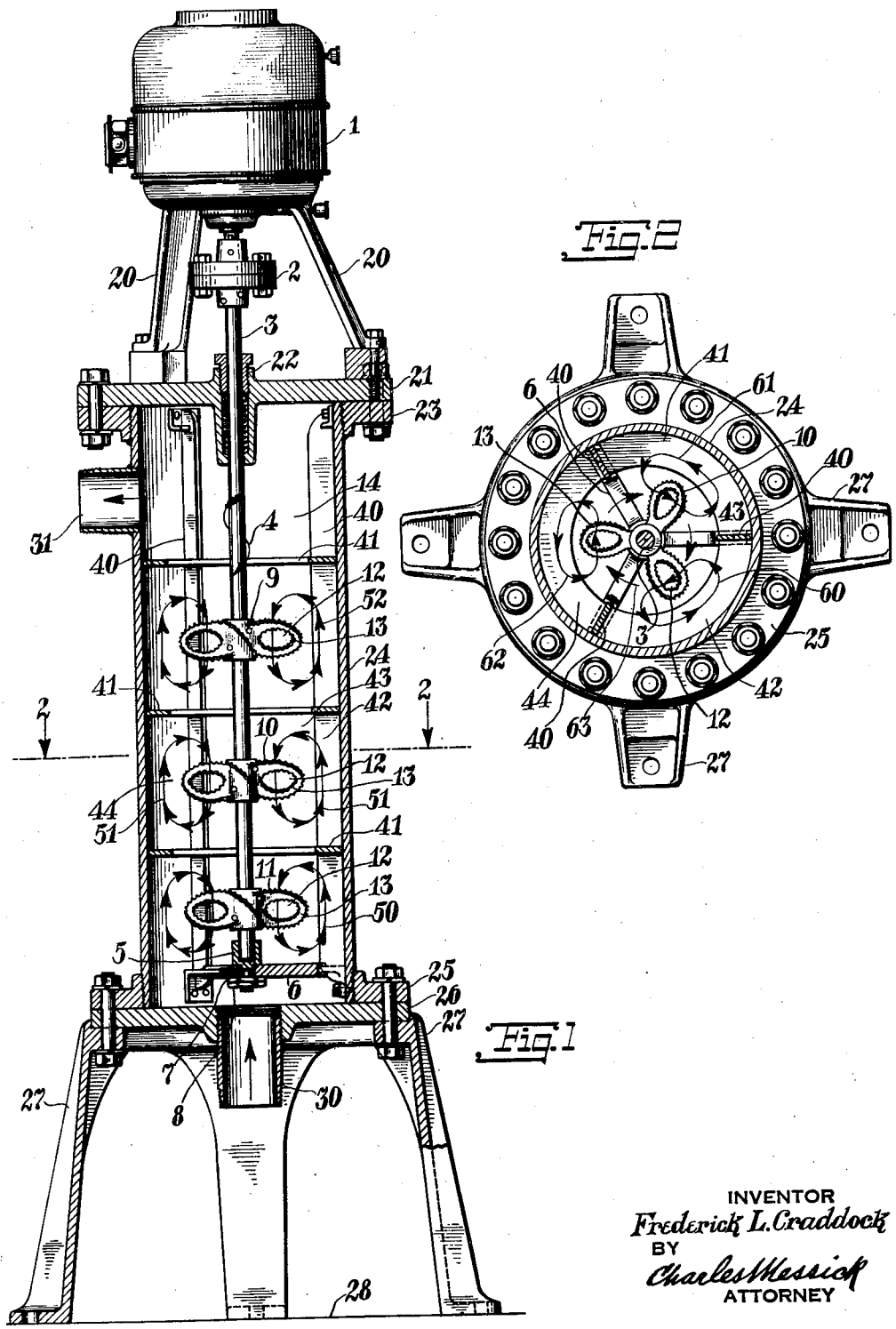
INVENTOR
Frederick L. Craddock
BY
Charles Messick
ATTORNEY Patented July 23, 1935

2,008,684

UNITED STATES PATENT OFFICE 2,008,684

EMULSIFYING UNIT

Frederick L. Craddock, Rochester, N. Y., assignor to Mixing Equipment Company Inc., Rochester, N. Y., a corporation of New York Application October 27, 1931, Serial No. 571,351

11 Claims. (Cl. 259—97)

This invention pertains to apparatus designed to mix fluids, liquids, semi-liquids, semi-solids, solids, etc. so as to form an intimate mixture or emulsion.

One object of the invention is to provide an improved emulsifying unit. Another object is to provide one or more improved elements for such a unit. Another object is to provide one or more improved combinations of the elements in such a unit. Another object is to provide an improved method of emulsification.

Other objects may appear from the following detailed description of a preferred embodiment of the invention and may be pointed out in the appended claims.

Referring to the accompanying drawing:—

Fig. 1 is a side elevation of my emulsifying unit, partly in section, and

Fig. 2 is a horizontal section taken on the line 2—2 of Fig. 1.

The numeral 1 indicates an air-jacketed motor of conventional type, provided with a conventional flexible coupling 2, from which is suspended a shaft 3, designed to rotate in the direction of the arrow 4. Shaft 3 is steadied at the lower end in a bearing 5, having a downward projection which is mounted in a spider 6 and secured therein by means of nuts 7 and 8.

Shaft 3 mounts three downwardly thrusting propellers 9, 10 and 11, which revolve as a unit with shaft 3 and are provided with holes 12 in each of their several blades 13. Both the edges of blades 13 and the holes 12 are serrated or toothed so as to make them more effective in emulsifying the mix 14 in which they are designed to operate. The mix 14 is assumed to be a transparent liquid so that the several parts of the emulsifying unit may be more clearly shown in the drawing.

Motor 1 is provided with a supporting frame 20 which is suitably secured to a flange 21 which contains a stuffing box 22 for shaft 3, to prevent upward leakage of the mix 14. Flange 21 is suitably secured to a coupling flange 23, into which is tightly threaded a short length of pipe 24 which terminates at its lower end in another coupling flange 25. Flange 25 is suitably secured to another flange 26 and to legs 27 which support the emulsifying unit upon a floor 28.

The flange 26 is also provided with a central nipple 30 through which the mix 14 is pumped into the chamber formed by members 21, 24 and 26. The required pump, which may be of any conventional type but is not shown, should be designed, like the emulsifying unit, for continuous operation and should be capable of irresistibly forcing the mix 14 through the nipple 30 into the chamber formed by members 26, 24 and 21, and out of the discharge nipple 31 against the combined downward thrust of propellers 11, 10 and 9.

Pipe 24 is provided with three vertical baffles 40 and with three horizontal ring baffles 41 secured rigidly, as indicated, to its inside surface. These baffles 40 and 41 cause the pockets to be formed around each of the propellers; those around propeller 10 being indicated by the numerals 42, 43 and 44 in Fig. 2. Similar pockets are formed as indicated in Fig. 1, around propellers 9 and 11. Each of the propellers 11, 10 and 9 may thus be considered as being the moving element in one of the three stages of my emulsifying unit.

Assuming that the unit is operating as above described: the mix is forced to circulate successively in three vortex ring-like stages, indicated by the arrows 50, 51, and 52 of Fig. 1, before it exits at 31.

In Fig. 2 the arrows 60, 61 and 62 indicate the horizontal movement of the mix 14 in the plane at which Fig. 2 is taken and which is coincident with the movement shown by the arrows 51 of Fig. 1. The arrows 63 of Fig. 2 indicate the gradual rotation of the mix 14 as a whole as it flows upward through the unit.

Thus the movement of the mix is very complex and the movements effect an improved method of emulsification which is highly efficient. However, the exact movement of the mix cannot be observed from the available apparatus. Thus the arrows above described are merely intended to show the theoretical movements of the mix in a general way.

I do not limit myself to the exact construction above described, which is merely one embodiment of my invention the scope whereof will be defined by the following claims.

I claim:—

1. In an emulsifying unit, the combination of a liquid tight hollow cylinder provided with a flanged attachment end portion, including a series of mixing chambers, each chamber being provided with sides having baffles extending a substantial portion of the diameter toward the center, an opening at the center and an assembly including a rotatable shaft provided with separate screw propellers for each of the several chambers, spaced apart on the shaft, designed so as to permit the insertion and withdrawal of the complete assembly through the openings.

2. In an emulsifying unit, the combination of a liquid tight hollow cylinder including a series of mixing chambers, each chamber being provided with sides having baffles extending toward the center, an opening at the center and an assembly including a rotatable shaft provided with propellers having holes in each blade surrounded by internally extending teeth, for the several chambers and designed so as to permit the insertion and withdrawal of the complete assembly through the openings.

3. The combination of a floor stand, a flange secured thereon and bolted to a second flange, a pipe threaded into the second flange and threaded at its upper end into a third flange, a fourth flange bolted thereto and provided with means to mount a motor, an assembly including shaft extending downwardly from the motor through the fourth flange and provided with several propellers, a lower bearing secured to the inside of the pipe and several vertical and horizontal baffles secured at the inside of the pipe in such a manner as to leave a clear central passage for the insertion and withdrawal of the shaft and propeller assembly.

4. In an emulsifying unit, the combination of a liquid tight hollow cylinder including a series of mixing chambers, provided with communicating openings and sides having baffles extending toward the center and an assembly including a rotatable shaft provided with propellers having holes in each blade surrounded by internally extending teeth, for the several chambers and designed so as to permit the insertion and withdrawal of the complete assembly through the openings.

5. The combination in an emulsifier of a casing provided with a series of vortex mixing chambers each having longitudinal baffle means extending a substantial distance inwardly and a rotatable shaft extending therethrough and carrying a separate screw propeller for each chamber, the ends of adjacent chambers being provided with holes of sufficiently large size to permit the insertion or withdrawal of the shaft and the propellers.

6. A mixing device provided with several communicating chambers in series, a revolvable shaft therein, and extending therethrough, the chambers being provided with substantially longitudinal baffle means extending inwardly of a substantial portion of the diameters and propeller means in the chambers, whereby successive vortices may be created in a mix passing through the device.

7. A mixing device provided with several communicating chambers in series, a revolvable shaft therein, said shaft being provided with a stuffing box bearing at its upper end and a steadying bearing at its lower end, and extending therethrough, the chambers being provided with substantially longitudinal baffle means extending inwardly of a substantial portion of the diameters and propeller means in the chambers, whereby successive vortices may be created in a mix passing through the device.

8. A mixing device provided with several communicating chambers in series, a revolvable shaft therein, and extending therethrough, the chambers being provided with substantially longitudinal baffle means extending inwardly of a substantial portion of the diameters and propeller means in the chambers, one of said propeller means being located in each of said chambers, whereby successive vortices may be created in a mix passing through the device.

9. A mixing device provided with several communicating chambers in series, a revolvable shaft therein, and extending therethrough, the chambers being provided with substantially longitudinal baffle means extending inwardly of a substantial portion of the diameters and propeller means in the chambers, one of said propeller means being located in each of the chambers substantially equidistant from both ends thereof, whereby successive vortices may be created in a mix passing through the device.

10. A mixing device provided with several communicating chambers in series, a revolvable shaft therein, and extending therethrough, the chambers being provided with substantially longitudinal baffle means extending inwardly of a substantial portion of the diameters and propeller means in the chambers, one of said propeller means being located in each of said chambers and all of said propeller means being designed to thrust in the same direction, whereby successive vortices may be created in a mix passing through the device.

11. A mixing device provided with several communicating chambers in series, a revolvable shaft therein, and extending therethrough, the chambers being provided with substantially longitudinal baffle means extending inwardly of a substantial portion of the diameters and propeller means in the chambers, each of said propeller means being designed to propel and thrust a mix outwardly at one end of a chamber, in one substantially longitudinal direction at the outer portion thereof, inwardly at the other end thereof and substantially in the opposite longitudinal direction at the axial portion thereof, whereby successive vortices may be created in a mix passing through the device.

FREDERICK L. CRADDOCK.